US011386208B1

(12) United States Patent
Lan et al.

(10) Patent No.: US 11,386,208 B1
(45) Date of Patent: Jul. 12, 2022

(54) SYSTEMS AND METHODS FOR MALWARE DETECTION USING LOCALIZED MACHINE LEARNING

(71) Applicant: CA, Inc., San Jose, CA (US)

(72) Inventors: Qichao Lan, Torrance, CA (US); Tao Cheng, Cypress, CA (US)

(73) Assignee: CA, INC., New York, NY (US)

( * ) Notice: Subject to any disclaimer, the term of this patent is extended or adjusted under 35 U.S.C. 154(b) by 541 days.

(21) Appl. No.: 16/414,341

(22) Filed: May 16, 2019

(51) Int. Cl.
*G06F 21/56* (2013.01)
*G06K 9/62* (2022.01)
*G06N 20/00* (2019.01)

(52) U.S. Cl.
CPC .......... *G06F 21/568* (2013.01); *G06F 21/566* (2013.01); *G06K 9/6218* (2013.01); *G06N 20/00* (2019.01)

(58) Field of Classification Search
CPC .... G06N 20/00; G06K 9/6218; G06F 21/568; G06F 21/566
See application file for complete search history.

(56) References Cited

U.S. PATENT DOCUMENTS

| | | | | |
|---|---|---|---|---|
| 2013/0304677 A1* | 11/2013 | Gupta | .................. | G06F 21/552 706/12 |
| 2015/0373043 A1* | 12/2015 | Wang | .................. | G06F 21/6254 706/12 |
| 2017/0063908 A1* | 3/2017 | Muddu | ................. | H04L 41/145 |
| 2017/0180418 A1* | 6/2017 | Shen | ................... | H04L 63/1416 |
| 2018/0189489 A1* | 7/2018 | Zhang | .................. | G06F 21/561 |
| 2019/0020669 A1* | 1/2019 | Glatfelter | .............. | H04W 12/12 |
| 2019/0166144 A1* | 5/2019 | Mirsky | ................. | G06N 7/005 |
| 2019/0387007 A1* | 12/2019 | Muddu | ................. | G06F 16/285 |
| 2020/0045063 A1* | 2/2020 | Zhang | ...................... | G06N 3/08 |
| 2020/0090002 A1* | 3/2020 | Zhu | ........................ | G06N 3/088 |
| 2021/0182404 A1* | 6/2021 | Shackleton | ............. | G06F 21/54 |

* cited by examiner

*Primary Examiner* — Hee K Song
(74) *Attorney, Agent, or Firm* — Foley & Lardner LLP (57) ABSTRACT

The disclosed computer-implemented method for malware detection using localized machine learning may include (i) generating a global score for a file using a global machine learning model, (ii) generating a localized score for the file using a localized machine learning model, (iii) determining that the file is malware using the global score, the localized score, and the local conviction threshold, and (iv) in response to determining that the file is malware, performing a security action to protect the computing device against malware. Various other methods, systems, and computer-readable media are also disclosed.

20 Claims, 8 Drawing Sheets

SYSTEMS AND METHODS FOR MALWARE DETECTION USING LOCALIZED MACHINE LEARNING

BACKGROUND

Client devices may use anti-malware services that utilize machine learning models to detect malware. A machine learning model may be deployed on a client device and may categorize a file as a malware threat through a learning process. The machine learning model may learn to recognize malicious attributes and use rules to make determinations about a file. Conventional systems train machine learning models on a global dataset prior to being deployed on client devices. The global dataset may be data obtained from a group of computing devices and environments. However, because of the differences in the environments of the different client devices, the machine learning models trained on global datasets may not be as effective in detecting malware in certain types of environments. The present disclosure, therefore, identifies and addresses a need for systems and methods for malware detection using localized machine learning.

SUMMARY

As will be described in greater detail below, the present disclosure describes various systems and methods for malware detection using localized machine learning.

In one example, a method for malware detection using localized machine learning may include (i) generating a global score for a file using a global machine learning model, (ii) generating a localized score for the file using a localized machine learning model, (iii) determining that the file is malware using the global score, the localized score, and a local conviction threshold, and (iv) in response to determining that the file is malware, performing a security action to protect the computing device.

The global machine learning model may be trained using a global dataset from a plurality of computing devices. In some examples, the localized machine learning model may be generated by re-training the global machine learning model using a local dataset of the computing device. In some examples, the method may include (i) identifying a number of new static clusters of computing devices in the computing environment of the computing device in a time period, (ii) determining that the number of new static clusters is below an identified threshold, and (iii) determining to use the localized machine learning model. The security action may include displaying, to a user of the computing device, an alert indicating that the file is malware and removing the file from the computing device.

In some examples, the method may include calculating a false positive rate of the computing device and determining the local conviction threshold using the false positive rate of the computing device. The false positive rate of the computing device may be recalculated. The local conviction threshold may be adjusted using the recalculated false positive rate of the computing device.

In one embodiment, a system for malware detection using localized machine learning may include at least one physical processor and physical memory that includes computer-executable instructions that, when executed by the physical processor, cause the physical processor to (i) generate a global score for a file using a global machine learning model, (ii) generate a localized score for the file using a localized machine learning model, (iii) determine that the file is malware using the global score, the localized score, and a local conviction threshold, and (iv) in response to determining that the file is malware, perform a security action to protect the computing device.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) generate a global score for a file using a global machine learning model, (ii) generate a localized score for the file using a localized machine learning model, (iii) determine that the file is malware using the global score, the localized score, and a local conviction threshold, and (iv) in response to determining that the file is malware, perform a security action to protect the computing device.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for malware detection using localized machine learning. As will be described in greater detail below, the systems and methods described herein may utilize both a global machine learning model and a localized machine learning model to detect malware on a computing device and reduce the false positive rate of detecting malware in the computing environment. Additionally, the systems and methods described herein may not require any type of telemetry to detect malware, increasing the privacy protection of the computing environment. For example, the system may utilize a received global machine learning model, but the process for detecting malware may be completed on the computing device without needing to transmit or receive any data to or from an external system. The lack of telemetry may eliminate vulnerabilities of data leakage to external systems through the data transmissions and increase the privacy protection of the computing environment.

In some examples, a global machine learning model may be a machine learning model trained using a global dataset that includes data from different computing devices in one or more computing environments. A local training dataset that includes data obtained from the computing environment of the computing device on which the localized machine learning model resides. The localized machine learning model may be generated by re-training the global machine learning model using the local training dataset, which may include data from a computing device and/or additional devices from the computing environment of the computing device. The scores generated by the global machine learning model and the localized machine learning model may be used to determine whether a file should be categorized as malware.

In some examples, the system may determine whether the computing device is a good candidate to utilize a localized machine learning model. The system may process incoming files for a period of time to determine whether the files are similar to existing files of the computing device. If the files are not similar, the system may determine that the computing device is not a good candidate for using localized machine learning models.

In some examples, the system may determine a false positive rate prediction based on information obtained from a computing environment of the computing device. For example, if the system determines that the computing environment of the computing device has a relatively high number of new static clusters (e.g., computing devices connected or grouped) within a given date range, the system may determine that the computing device of the computing environment is not a good candidate for a localized machine learning model due to the likelihood that the different clusters have different types of files which may increase the false positive rate of the computing environment. In some examples, having too many static clusters of devices that are different from each other may make it difficult for a localized machine learning model to detect malware.

If the system determines that the environment is a good candidate for localized machine learning models, the system may select a conviction threshold based on data obtained from the computing devices from the computing environment. The conviction threshold may be based on a false positive rate of the computing environment. The conviction threshold may be used to categorize or convict files as malware. By adjusting the conviction threshold to reflect the false positive rate of the computing environment, the system may help to reduce the number of false positive convictions of files of the computing environment.

In some examples, the system may be a cloud-based system. The cloud-based system may collect data from computing devices of a computing environment. The data collected from the computing devices may be used to generate a localized machine learning model in a cloud service associated with the computing environment. The localized machine learning model for the computing environment may be generated by re-training the global machine learning model using the collected data from the computing devices of the computing environment. The localized machine learning models may then be transmitted from the cloud service to a computing device of the computing environment. The computing device may then use the localized machine learning model to process incoming files and detect potential malware.

Figure 1:
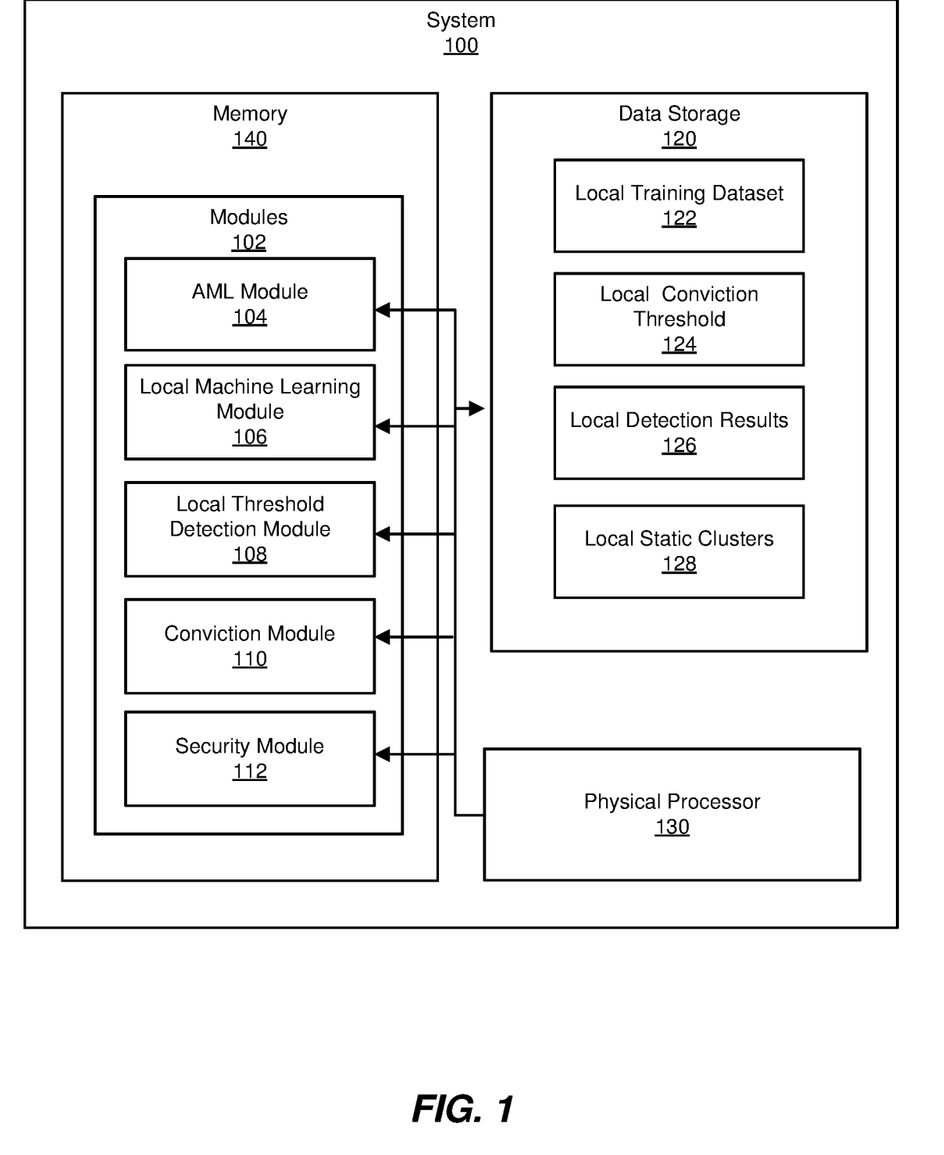
FIG. 1 is a block diagram of an example system for malware detection using localized machine learning.
Figure 2:
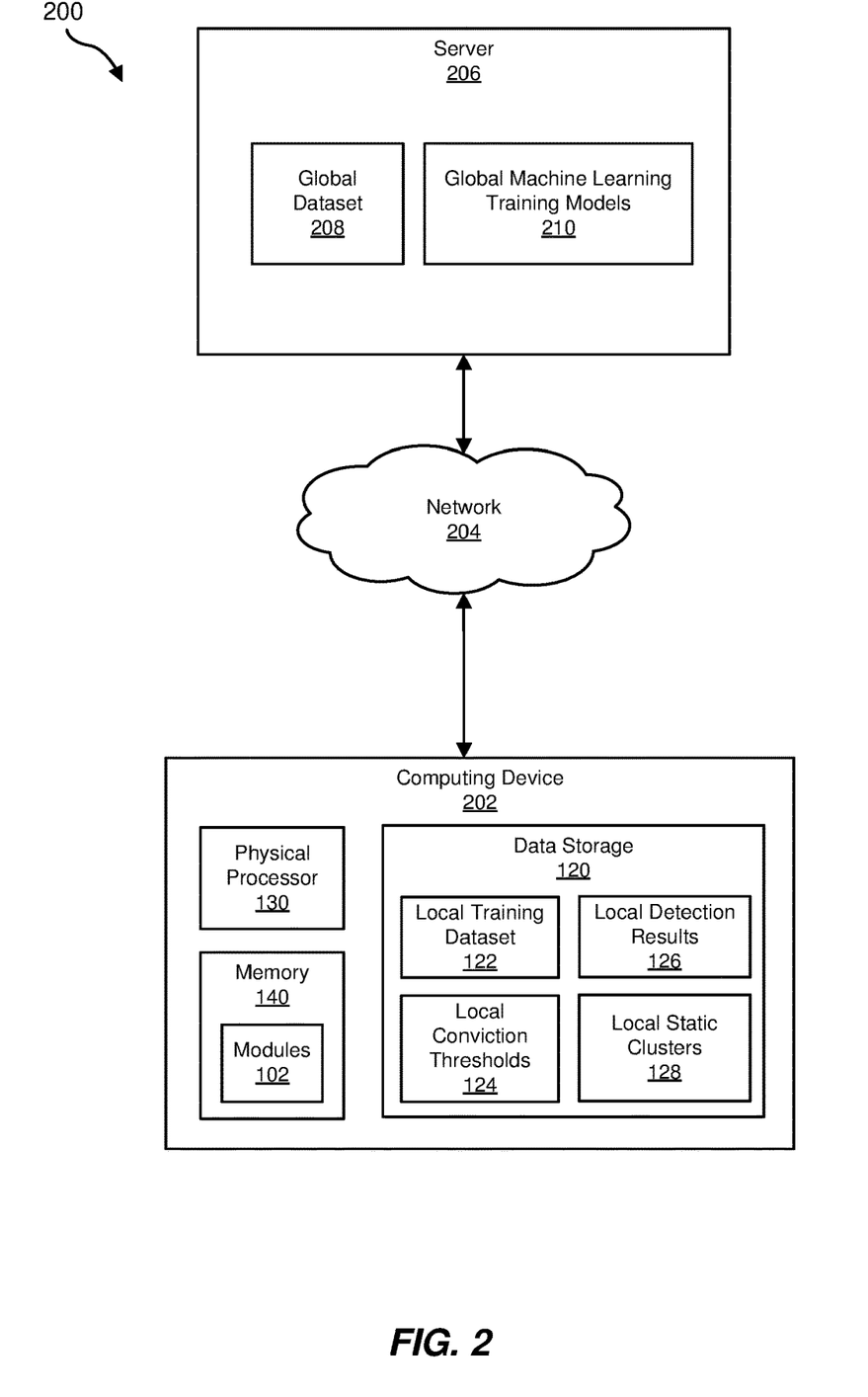
FIG. 2 is a block diagram of an additional example system for malware detection using localized machine learning.

The following will provide, with reference to FIGS. 1-2, detailed descriptions of example systems for malware detection using localized machine learning. Detailed descriptions of corresponding computer-implemented methods will also be provided in connection with FIGS. 3-4. Detailed descriptions of data flow through the example systems for malware detection using localized machine learning will also be provided in connection with FIGS. 5-6. In addition, detailed descriptions of an example computing system and network architecture capable of implementing one or more of the embodiments described herein will be provided in connection with FIGS. 7 and 8, respectively.

FIG. 1 is a block diagram of an example system 100 for malware detection using localized machine learning. As illustrated in this figure, the example system 100 may include one or more modules 102 for performing one or more tasks. As will be explained in greater detail below, the modules 102 may include an advanced machine learning (AML) module 104, a local machine learning module 106, a local threshold detection module 108, conviction module 110, and a security module 112. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., computing device 202 and/or server 206). One or more of the modules 102 in FIG. 1 may also represent all or portions of one or more special-purpose computers configured to perform one or more tasks.

As illustrated in FIG. 1, example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of the modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as physical processor 130. The physical processor 130 generally represents any type or form of hardware-implemented processing unit capable of interpreting and/or executing computer-readable instructions. In one example, the physical processor 130 may access and/or modify one or more of the modules 102 stored in memory 140. Additionally, or alternatively, the physical processor 130 may execute one or more of the modules 102 to facilitate malware detection using localized machine learning. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the example system 100 may also include data storage 120. The data storage 120 generally represents any type or form of computing device capable of data storage. In one example, the data storage 120 may store local training dataset 122, local conviction threshold 124, local detection results 126, and/or local static clusters 128.

Example system 100 in FIG. 1 may be implemented in a variety of ways. For example, all or a portion of the example system 100 may represent portions of example system 200 in FIG. 2. As shown in FIG. 2, the system 200 may include a computing device 202 in communication with a server 206 via a network 204. In one example, all or a portion of the functionality of the modules 102 may be performed by the computing device 202, the server 206, and/or any other suitable computing system. As will be described in greater detail below, one or more of the modules 102 from FIG. 1 may, when executed by at least one processor of the computing device 202 and/or the server 206, enable the computing device 202 and/or the server 206 to detect malware using localized machine learning models. For example, and as will be described in greater detail below, one or more of the modules 102 may cause the computing device 202 and/or the server 206 to generate a global score for a file using a global machine learning model and generate a localized score for the file using a localized machine learning model. The modules 102 may further cause the computing device 202 and/or the server 206 to determine a local conviction threshold 124 for the computing device or computing environment. The global score, localized score, and the local conviction threshold 124 may be used to determine whether the file is malware. In response to determining that the file is malware, a security action may be performed to protect the computing device.

The computing device 202 generally represents any type or form of computing device capable of reading computer-executable instructions. For example, the computing device 202 may include an endpoint device (e.g., a mobile computing device) running client-side security software capable of utilizing machine learning models to detect malware. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The server 206 generally represents any type or form of computing device that is capable of reading computer-executable instructions. In one example, the server 206 may represent a server capable of generating global machine learning models. Global machine learning training models 210 may use global datasets 208 to build global machine learning models and distribute them to computing devices 202. Additional examples of the server 206 include, without limitation, security servers, application servers, web servers, storage servers, and/or database servers configured to run certain software applications and/or provide various security, web, storage, and/or database services. Although illustrated as a single entity in FIG. 2, the server 206 may include and/or represent a plurality of servers that work and/or operate in conjunction with one another.

The network 204 generally represents any medium or architecture capable of facilitating communication or data transfer. In one example, the network 204 may facilitate communication between the computing device 202 and the server 206. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
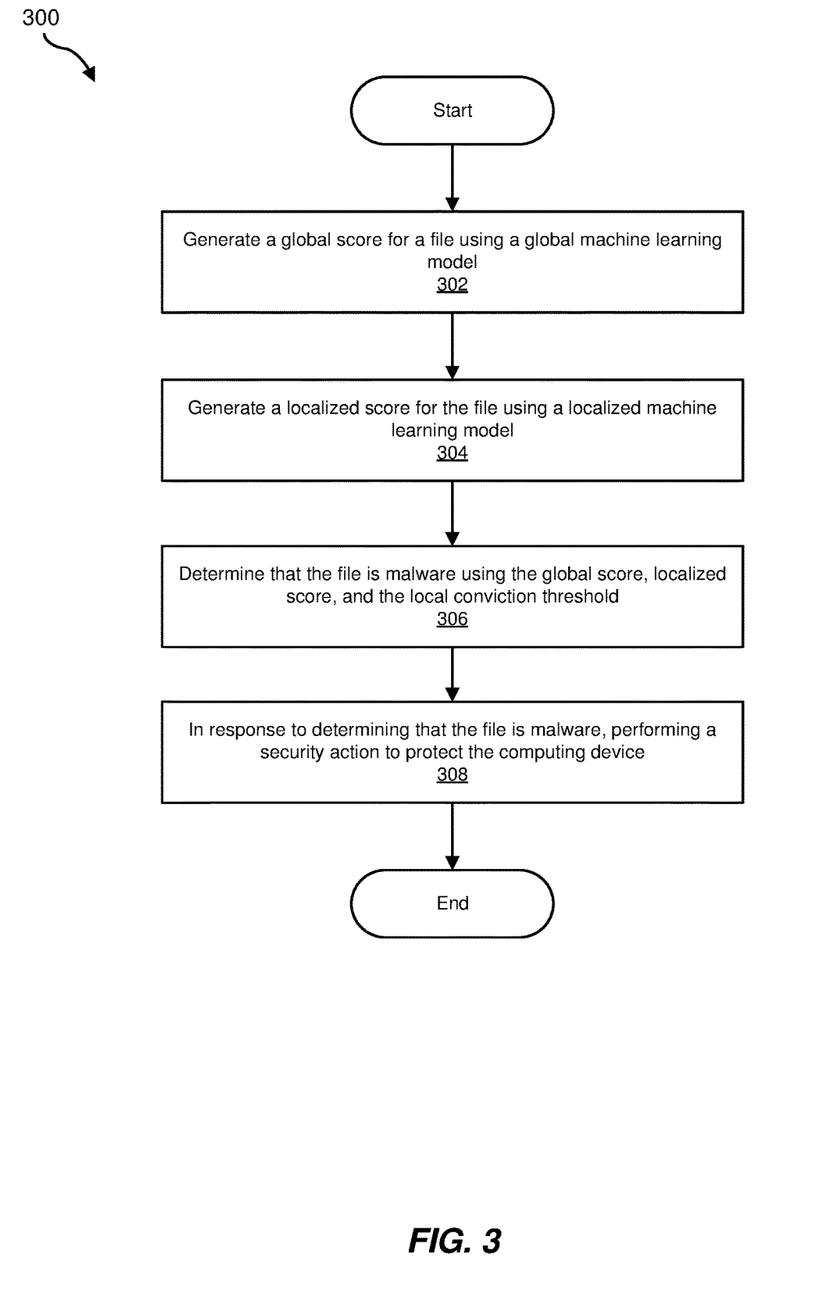
FIG. 3 is a flow diagram of an example method for malware detection using localized machine learning.

FIG. 3 is a flow diagram of an example computer-implemented method 300 for malware detection using localized machine learning. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may generate a global score for a file using a global machine learning model. The system may generate a global score for a file in any suitable manner. For example, the AML module 104 may, as part of computing device 202 in FIG. 2, generate a global score for a file on the computing device using a global machine learning model. In some examples, the global machine learning model may be trained on a server, such as the server 206, using a dataset, such as the global dataset 208. The global dataset 208 may include example data obtained from different computing devices and/or computing environments.

The term "computing environment," as used herein, generally refers to a collection of computing devices, software, and/or networks that support the processing and exchange of data to support various types of computing solutions. In some examples, the computing environment may be associated with an organization, business, or other organized institute. Computing environments may be closed to devices and users outside of the organization or business. Within the computing environment, once authenticated, users and computing devices may share data and resources without further verification and authentication.

The global dataset 208 may include pairs of an input vector and the corresponding output vector. The global machine learning model may run using the global dataset 208 and produce a result, which is then compared with the output vector or target. The parameters of the global machine learning model may be adjusted based on the result of the comparison of the input vector and output vector. After the global machine learning model has been trained on the global dataset 208, the model may be published to one or more computing devices, such as the computing device 202. The global machine learning model may generate a score, such as the global score for a file, indicative of a likelihood that a file is or has malware. The score may be a numeric value indicative of a likelihood that the file is or has malware.

The term "global machine learning model," as used herein, generally refers to a machine learning model trained by a training model, such as global machine learning training model 210 using a global dataset, such as global dataset 208. A machine learning model may be an algorithm or statistical model used to perform specific tasks (e.g., convicting files of malware) without using explicit instructions and instead learning from patterns and inferences obtained by training the model using a dataset.

At step 304, one or more of the systems described herein may generate a localized score for the file using a localized machine learning model. The system may perform this step in any suitable manner. For example, the local machine learning module 106 may generate a localized score for the file using a localized machine learning model. In some examples, the localized machine learning model may be generated by re-training the global machine learning model using a local training dataset 122 of the computing device 202 and/or the local training dataset 122 of the computing environment of the computing device 202, which may include data from multiple devices in the computing environment.

The term "localized machine learning model," as used herein, generally refers to a global machine learning model adjusted and/or re-trained on a localized dataset, such as local training dataset 122. The local training dataset 122 may include data obtained from one or more computing devices 202 in a computing environment. For example, the global machine learning model may be localized by re-training the global machine learning model using the local training dataset 122. By generating the localized machine learning model by training the global machine learning model using the local training dataset 122, the localized machine learning model will be customized to process files local to the computing device 202 and/or the computing environment of the computing device 202 and detect malware based on information specific to the computing environment of the computing device 202. File types and types of malware not relevant to the computing environment may no longer be detected by the localized machine learning model and resources may be customized to identify files and malware specific to the computing environment. A localized machine learning model may reduce the false positive rate of malware detection on the computing device 202.

In some examples, new types of malware may infiltrate the computing device 202. Because the localized machine learning model is trained using the local training dataset 122, the localized machine learning model may not identify a new type of malware or may not detect the new malware immediately. The use of both a global machine learning model and the localized machine learning model may increase the efficiency of malware detection and reduce the false positive rate of the malware detection.

In some examples, the local threshold detection module 108 may calculate a predicted false positive rate using information from the computing device 202 and/or a computing environment of the computing device 202. Determining local conviction thresholds are further discussed in relation to FIG. 4.

The term "false positive rate," as used herein, generally refers to a ratio indicating the number of files incorrectly identified as malware to the total number of files identified as malware. The false positive rate of a computing device may be determined by obtaining data from different malware detection systems and identification of the number of files incorrectly identified as malware.

The local machine learning module 106 may obtain data from the computing environment of the computing device 202 to identify the number of new local static clusters 128 of computing devices in the computing environment of the computing device 202. In some examples, the number of new local static clusters 128 may be detected within an identified time period (e.g., hours, days, months, etc.). The local static clusters 128 may be a group of computing devices in a computing environment that may share a common purpose, hardware/software type, or the like. Too many local static clusters 128 may make a localized machine learning model prone to a higher false positive rate. The number of local static clusters 128 may be compared to a threshold. If the number of local static clusters 128 is below the identified threshold, the local machine learning module 106 may determine that the computing device 202 is a good candidate for utilizing a localized machine learning model.

In response to determining that the computing device 202 is a good candidate, the AML module 104 may generate a localized machine learning model by re-training the global machine learning model using the local training dataset 122. The local training dataset 122 may be a training dataset that includes data collected from one or more computing devices from the computing environment of the computing device 202. In some examples, the data for the local training dataset 122 may be collected for a specified period of time (e.g., days, weeks, months, etc.). Upon the generation of the localized machine learning model, the local machine learning module 106 may generate a localized score for the file. The localized score for the file may be a numeric value generated by the localized machine learning model that indicates the likelihood that the file is or has malware.

At step 306, one or more of the systems described herein may determine that the file is malware using the global score, the localized score, and/or a local conviction threshold. The system may perform this step in any suitable manner. The conviction module 110 may receive the global score and the localized score from the AML module 104, the local machine learning module 106, and/or the local conviction threshold 124 from data storage 120. The conviction module 110 may perform a calculation using the global score and/or the localized score. For example, the conviction module 110 may add the scores, average the scores, select the higher of the two scores, or similar. In some examples, the global score and the localized score may be used in a linear regression model to determine whether to convict the file as malware. The conviction module 110 may then compare the result to the local conviction threshold 124 to determine whether to categorize the file as malware or benign. In some examples, if the result of the calculation using the scores is higher than the local conviction threshold 124, then the file may be categorized as malware. In some examples, if the result is lower than the local conviction threshold 124, then the file may be categorized as malware. In some examples, the global score may be compared to the local conviction threshold 124 and the localized score may be compared to the local conviction threshold 124 and if either of the scores is higher (or lower, depending on the determination criteria) than the threshold, the file may be categorized as malware.

At step 308, one or more of the systems described herein may, in response to determining that the file is malware, perform a security action to protect the computing device. The system may perform this step in any suitable manner. For example, the security module 112 may, as part of computing device 202 in FIG. 2, perform a security action to protect the computing device 202.

In some examples, the security action may be to display, to a user of the computing device 202, an alert indicating that the file has been categorized as malware. The alert may be a pop-up alert, overlay, push notification, email, text, or the like. The security action may include moving the file from a current location to a different location to quarantine the file for further analysis or to delete the file from the computing device 202.

Figure 4:
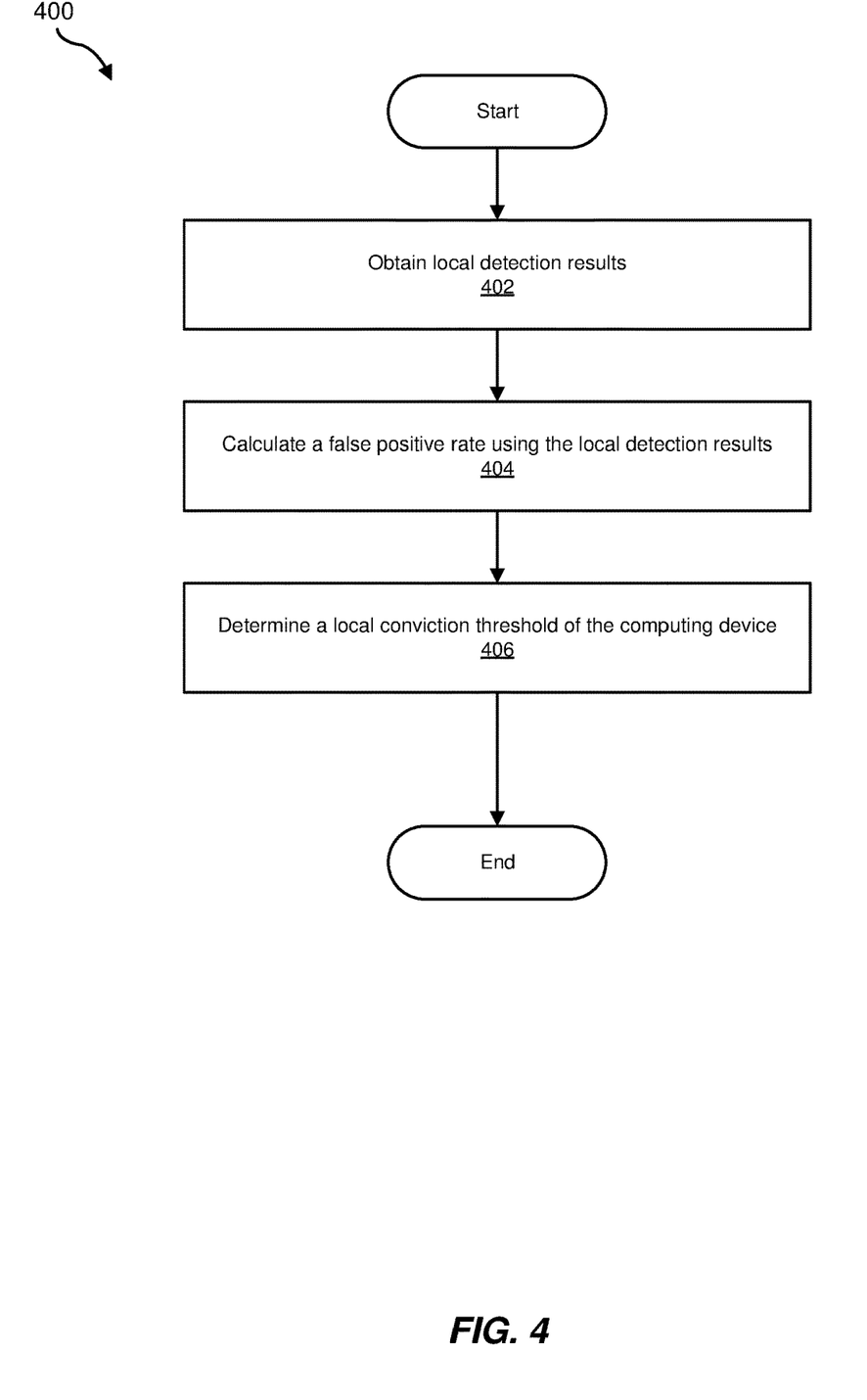
FIG. 4 is a flow diagram of an example method for generating a local conviction threshold.
Figure 5:
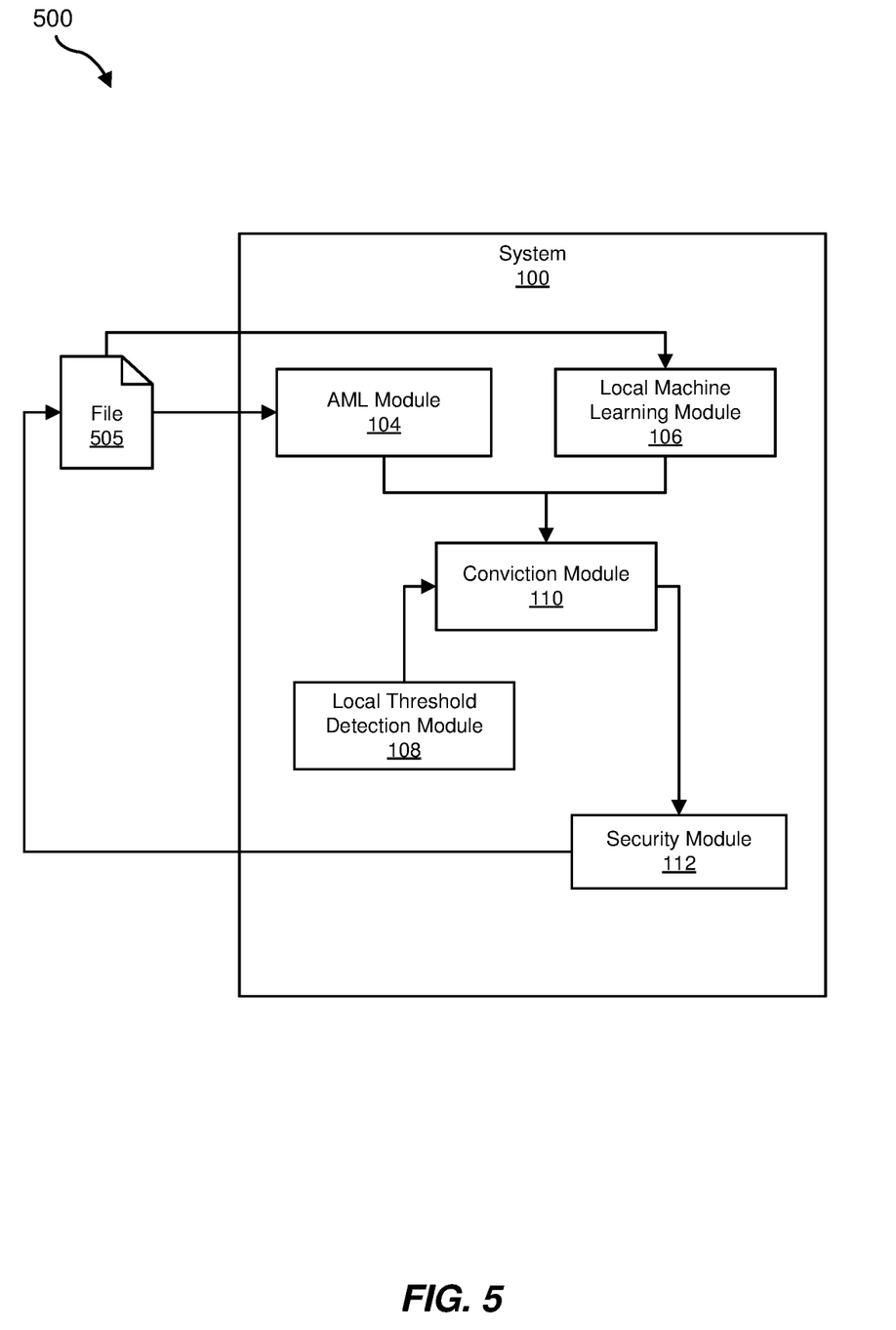
FIG. 5 is a data flow diagram of an example system for malware detection using localized machine learning.

FIG. 4 is a flow diagram of an example computer-implemented method 400 for generating a local conviction threshold malware detection using localized machine learning. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may obtain local detection results. The system may obtain local detection results in any suitable manner. For example, the local threshold detection module 108 may, as part of computing device 202 in FIG. 2, obtain local detection results, such as the local detection results 126, from the computing device 202. In some examples, the local threshold detection module 108 may obtain local detection results from one or more other computing devices from the computing environment of the computing device 202.

The term "local detection results," as used herein, generally refers metrics associated with protecting files of a computing device from malware threats. For example, the metrics may include a number of files that have been scanned by the system to detect malware, the number of files flagged as possible malware, the number of files confirmed to be incorrectly flagged as malware (e.g., false positive categorization), the number of files confirmed to infected with malware, the types of files that have been scanned, the types of files that have been flagged as malware, and the like.

At step 404, one or more of the systems described herein may calculate a false positive rate using the local detection results. The system may perform this step in any suitable manner. For example, the local threshold detection module 108 may calculate a false positive rate of the computing device 202 using the local detection results. In some examples, the false positive rate may be a ratio indicating the number of files incorrectly identified as malware to the total number of files identified as malware. In some examples, the local threshold detection module 108 may confirm the number of files incorrectly identified as malware and divide the number by the total number of files identified as malware. In some examples, the local threshold detection module 108 may use local detection results 126 from an identified period of time (e.g., daily, current week, etc.).

The false positive rate of a computing device may be determined by obtaining local detection results 126 from different malware detection systems and identification of the number of files incorrectly identified as malware. In some examples, the local threshold detection module 108 may calculate a false positive rate for the computing device 202. In some examples, the local threshold detection module 108 may obtain local detection results 126 from other devices in the computing environment and may calculate a false positive rate for the computing environment.

At step 406, one or more of the systems described herein may determine a local conviction threshold of the computing device. The system may determine the local conviction threshold in any suitable manner. For example, the local threshold detection module 108 may determine the local conviction threshold, such as local conviction threshold 124. The local threshold detection module 108 may determine or set the local conviction threshold 124 using the calculated false positive rate of the computing device 202.

In some examples, the local threshold detection module 108 may generate or calculate a local conviction threshold using the false positive rate of the computing device 202. The local conviction threshold may be a numeric value used determine whether a file should be categorized as malware or benign. In some examples, the local conviction threshold may be based on the false positive rate of the computing device 202. The local threshold detection module 108 may use one or more formulas to determine a local conviction threshold 124 to approximate that the likely number of files to be falsely detected as malware is equal to or less than the false positive rate calculated in step 404.

In some examples, the global score and/or the localized score may be compared to the local conviction threshold 124. Depending on the metric used to categorize the file (e.g., the score is higher than the local conviction threshold, within a range of the local conviction threshold, below the local conviction threshold, etc.), the file may be categorized as malware.

In some examples, the false positive rate of the computing device 202 may be recalculated. The false positive rate may be recalculated periodically (e.g., daily, weekly, etc.) or may be recalculated in response to an event (e.g., a threshold number of files identified as miscategorized, etc.). In response to recalculating the false positive rate, the local threshold detection module 108 may adjust the local conviction threshold using the recalculated false positive rate of the computing device 202.

The example system 100 in FIG. 1 may be implemented in a variety of ways. For example, all or a portion of the example system 100 may represent portions of the system 500 in FIG. 5. As will be described in greater detail below, one or more of the modules 102 from FIG. 1 may, when executed by at least one processor of the computing device 202, enable the system 500 to detect malware in a computing environment using localized machine learning models. For example, and as will be described in greater detail below, one or more of the modules 102 may cause the example system 500 to receive or scan a file 505 on a computing device 202. The AML module 104 may generate a global score using a global machine learning model trained on a global dataset. The local machine learning module 106 may generate a localized score using a localized machine learning model trained on a local training dataset 122. The conviction module 110 determines whether the file is or has malware based on the received the global score, the localized score, and/or a local conviction threshold 124 from the local threshold detection module 108. If the conviction module 110 determines that the file 405 is or has malware, the security module 112 performs a security action, such as removing the file 405 and notifying the user of the computing device 202.

The example system 100 in FIG. 1 may be implemented in a variety of ways. For example, all or a portion of the example system 100 may represent portions of the cloud-based system 600 in FIG. 6. As will be described in greater detail below, one or more of the modules 102 from FIG. 1 may, when executed by at least one processor of the computing device 202, enable the system 600 to detect malware in a cloud-based computing environment using localized machine learning models. For example, and as will be described in greater detail below, one or more of the modules 102 may cause the example system 600 to generate a global machine learning model to be used to detect malware. In some examples, global machine learning training models 210 of a server 206 may use global datasets 208 to build global machine learning models. The global dataset 208 may include data from different types of computing devices and computing environments. The global AML module 602 may distribute the generated global machine learning models to computing devices, such as computing device 202. The global AML module 602 may distribute the generated global machine learning model to a specified cloud service associated with a computing environment of the computing device 202, such as cloud server 604. The cloud service may be a centralized location to generate and manage the localized machine learning models for the associated computing environment. The cloud service may manage data collection from computing devices associated with the computing environment, manage generation and distribution of localized machine learning models to the computing devices associated with the computing environment, and manage the generation of the local conviction thresholds for the computing environment using data collected from the computing devices of the computing environment.

Figure 6:
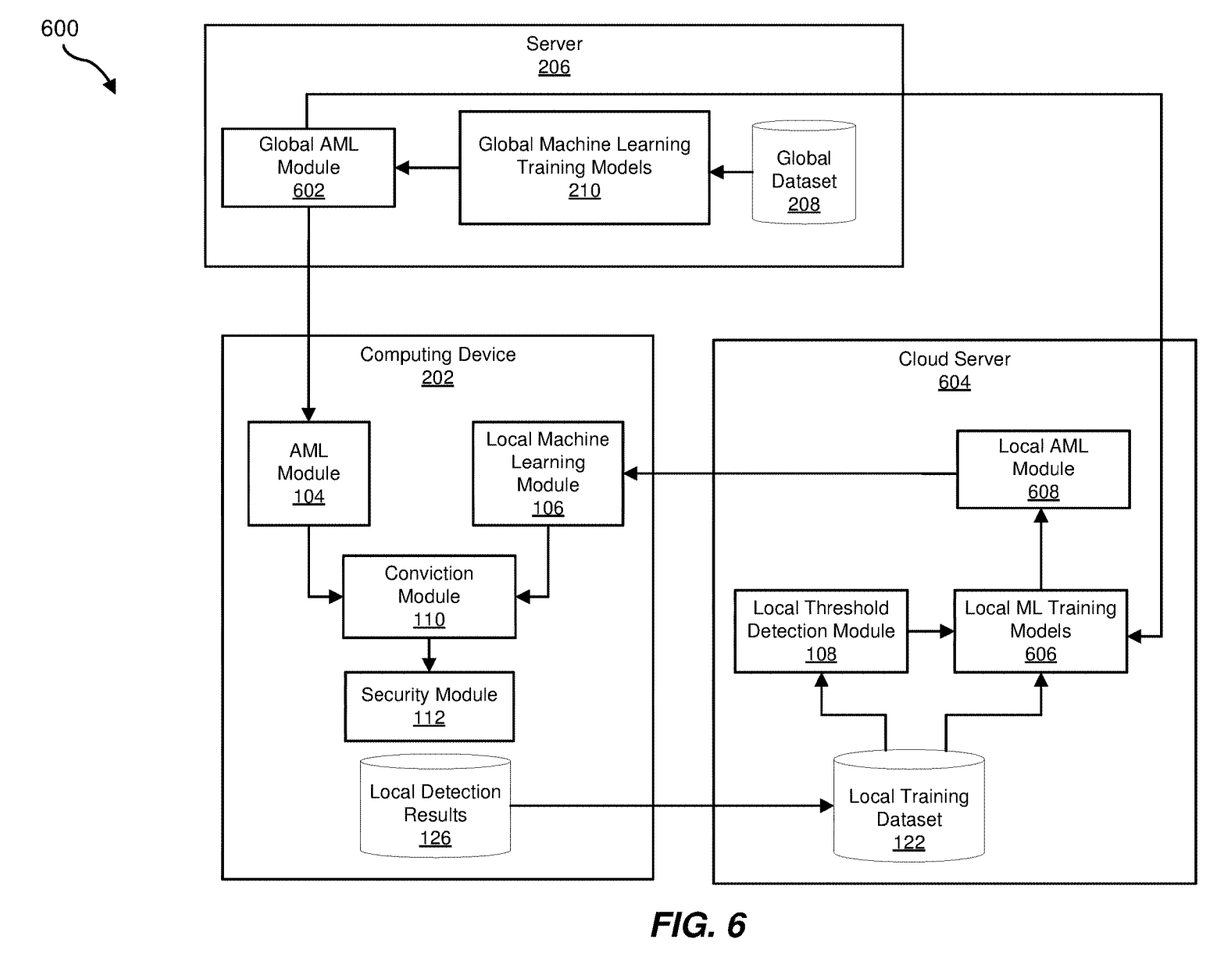
FIG. 6 is a data flow diagram of an example cloud-based system for malware detection using machine learning.

Although the cloud service is depicted as a single entity (e.g., cloud server 604), the cloud service may include and/or represent a plurality of servers and/or computing devices that work and/or operate in conjunction with one another.

In some examples, the computing devices of the computing environment, including the computing device 202, may transmit their respective local detection results 126 to the cloud server 604. The local detection results 126 from the respective computing devices of the computing environment may be added to the local training dataset 122 of the cloud server 604. The local threshold detection module 108 of the cloud server 604 may calculate a predicted false positive rate using the local training dataset 122 and may generate or calculate a local conviction threshold using the false positive rate, as described in association with FIG. 4.

In some examples, the local ML training models 606 of the cloud server 604 may receive a global machine learning model from the server 206. The local ML training model 606 may generate the localized machine learning model for the computing environment associated with the cloud service by re-training the global machine learning model using the local training dataset 122 and the local conviction threshold from the local threshold detection module 108. The local AML module 608 may distribute the localized machine learning model to computing devices of the computing environment, such as the computing device 202.

In some examples, the AML module 104 of the computing device may receive the global machine learning model from the global AML module 602. The local machine learning module 106 of the computing device may receive the localized machine learning model from the local AML module 608 of the cloud server 604. The computing device 202 may receive or scan an incoming file. The AML module 104 may generate a global score for the file using the global machine learning model received from the server 206. The local machine learning module 106 may generate a localized score for the file using the localized machine learning model from the cloud server 604. The conviction module 110 may determine whether the file is or has malware based on the received global score, the localized score, and/or a local conviction threshold 124 from the local threshold detection module 108. In some examples, the local conviction threshold 124 may have been obtained from the cloud server 604 with the localized machine learning model. If the conviction module 110 determines that the file is or has malware, the security module 112 may perform a security action, such as removing the file and notifying the user of the computing device 202.

Existing machine learning models used to identify malware may not be sufficient to identify and remediate malware from some computing environments. Using machine learning models trained on a global dataset compiled from different computing devices may not sufficiently detect malware in some systems. The systems and methods described herein are directed to using a localized machine learning model to detect malware in a computing environment. A computing device may receive a global machine learning model trained on a global dataset. The system may determine that the computing device is a good candidate for using a localized machine learning model to detect malware on a computing device and generate a localized score using the localized machine learning model. The system may use scores from both the global machine learning model and the localized machine learning model to determine whether a file should be categorized as malware. The system may perform a security action based on the scores to protect the computing environment from the detected malware.

Figure 7:
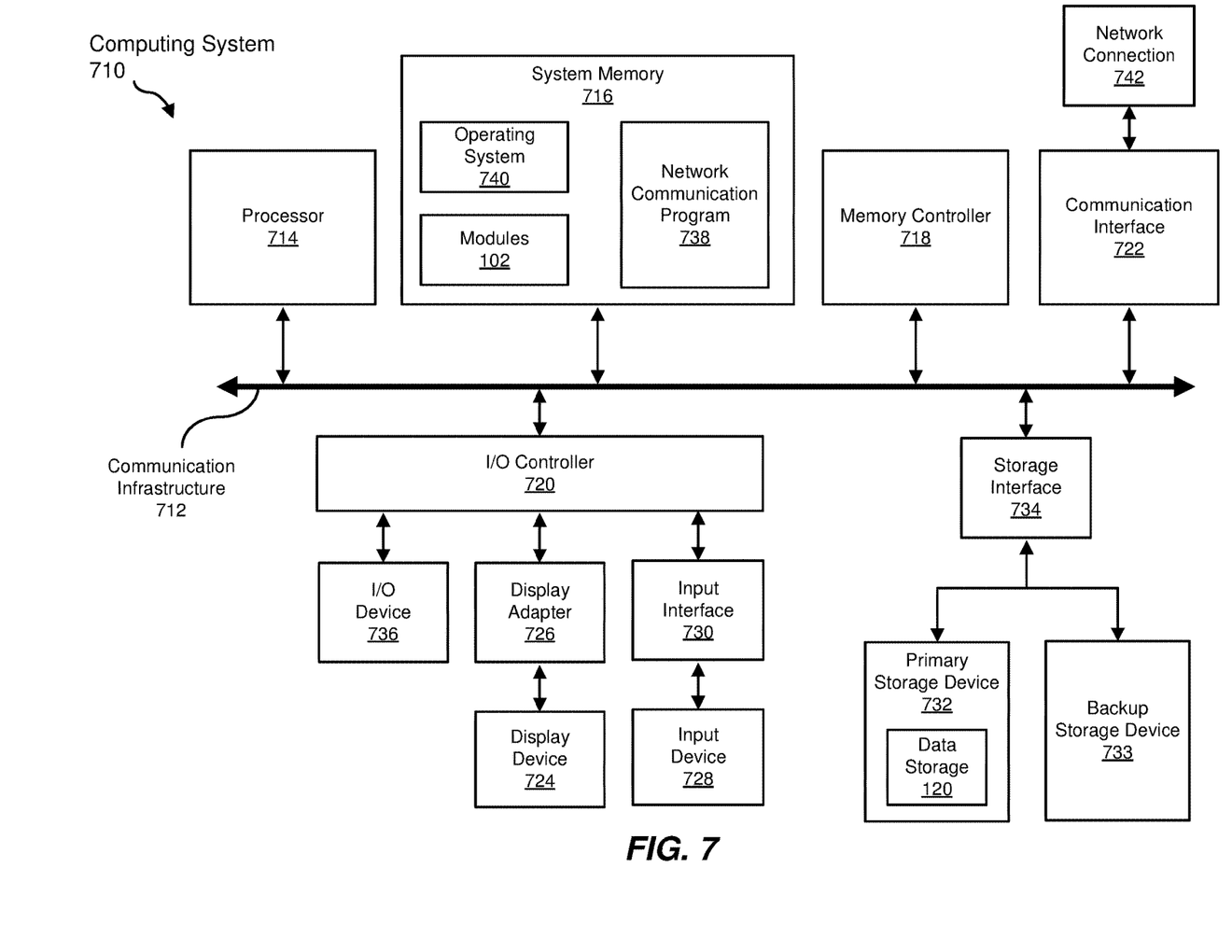
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of the computing system 710 may perform and/or be a means for performing, either alone or in combination with other elements, one or more of the steps described herein (such as one or more of the steps illustrated in FIG. 3). All or a portion of the computing system 710 may also perform and/or be a means for performing any other steps, methods, or processes described and/or illustrated herein.

The computing system 710 broadly represents any single or multi-processor computing device or system capable of executing computer-readable instructions. Examples of the computing system 710 include, without limitation, workstations, laptops, client-side terminals, servers, distributed computing systems, handheld devices, or any other computing system or device. In its most basic configuration, the computing system 710 may include at least one processor 714 and a system memory 716.

The processor 714 generally represents any type or form of physical processing unit (e.g., a hardware-implemented central processing unit) capable of processing data or interpreting and executing instructions. In certain embodiments, the processor 714 may receive instructions from a software application or module. These instructions may cause the processor 714 to perform the functions of one or more of the example embodiments described and/or illustrated herein.

The system memory 716 generally represents any type or form of volatile or non-volatile storage device or medium capable of storing data and/or other computer-readable instructions. Examples of the system memory 716 include, without limitation, Random Access Memory (RAM), Read Only Memory (ROM), flash memory, or any other suitable memory device. Although not required, in certain embodiments the computing system 710 may include both a volatile memory unit (such as, for example, the system memory 716) and a non-volatile storage device (such as, for example, the primary storage device 732, as described in detail below). In one example, one or more of the modules 102 from FIG. 1 may be loaded into the system memory 716.

In some examples, the system memory 716 may store and/or load an operating system 740 for execution by the processor 714. In one example, the operating system 740 may include and/or represent software that manages computer hardware and software resources and/or provides common services to computer programs and/or applications on the computing system 710. Examples of the operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 710 may also include one or more components or elements in addition to the processor 714 and the system memory 716. For example, as illustrated in FIG. 7, the computing system 710 may include a memory controller 718, an Input/Output (I/O) controller 720, and a communication interface 722, each of which may be interconnected via a communication infrastructure 712. The communication infrastructure 712 generally represents any type or form of infrastructure capable of facilitating communication between one or more components of a computing device. Examples of the communication infrastructure 712 include, without limitation, a communication bus (such as an Industry Standard Architecture (ISA), Peripheral Component Interconnect (PCI), PCI Express (PCIe), or similar bus) and a network.

The memory controller 718 generally represents any type or form of device capable of handling memory or data or controlling communication between one or more components of the computing system 710. For example, in certain embodiments, the memory controller 718 may control communication between the processor 714, the system memory 716, and the I/O controller 720 via the communication infrastructure 712.

The I/O controller 720 generally represents any type or form of module capable of coordinating and/or controlling the input and output functions of a computing device. For example, in certain embodiments, the I/O controller 720 may control or facilitate transfer of data between one or more elements of the computing system 710, such as the processor 714, the system memory 716, the communication interface 722, the display adapter 726, the input interface 730, and the storage interface 734.

As illustrated in FIG. 7, the computing system 710 may also include at least one display device 724 coupled to the I/O controller 720 via a display adapter 726. The display device 724 generally represents any type or form of device capable of visually displaying information forwarded by the display adapter 726. Similarly, the display adapter 726 generally represents any type or form of device configured to forward graphics, text, and other data from the communication infrastructure 712 (or from a frame buffer, as known in the art) for display on the display device 724.

As illustrated in FIG. 7, the example computing system 710 may also include at least one input device 728 coupled to the I/O controller 720 via an input interface 730. The input device 728 generally represents any type or form of input device capable of providing input, either computer or human generated, to the example computing system 710. Examples of the input device 728 include, without limitation, a keyboard, a pointing device, a speech recognition device, variations or combinations of one or more of the same, and/or any other input device.

Additionally, or alternatively, the example computing system 710 may include additional I/O devices. For example, the example computing system 710 may include the I/O device 736. In this example, the I/O device 736 may include and/or represent a user interface that facilitates human interaction with the computing system 710. Examples of the I/O device 736 include, without limitation, a computer mouse, a keyboard, a monitor, a printer, a modem, a camera, a scanner, a microphone, a touchscreen device, variations or combinations of one or more of the same, and/or any other I/O device.

The communication interface 722 broadly represents any type or form of communication device or adapter capable of facilitating communication between the example computing system 710 and one or more additional devices. For example, in certain embodiments, the communication interface 722 may facilitate communication between the computing system 710 and a private or public network including additional computing systems. Examples of the communication interface 722 include, without limitation, a wired network interface (such as a network interface card), a wireless network interface (such as a wireless network interface card), a modem, and any other suitable interface. In at least one embodiment, the communication interface 722 may provide a direct connection to a remote server via a direct link to a network, such as the Internet. The communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 722 may also represent a host adapter configured to facilitate communication between the computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 722 may also allow the computing system 710 to engage in distributed or remote computing. For example, the communication interface 722 may receive instructions from a remote device or send instructions to a remote device for execution.

In some examples, the system memory 716 may store and/or load a network communication program 738 for execution by the processor 714. In one example, the network communication program 738 may include and/or represent software that enables the computing system 710 to establish a network connection 742 with another computing system (not illustrated in FIG. 7) and/or communicate with the other computing system by way of the communication interface 722. In this example, the network communication program 738 may direct the flow of outgoing traffic that is sent to the other computing system via the network connection 742. Additionally, or alternatively, the network communication program 738 may direct the processing of incoming traffic that is received from the other computing system via the network connection 742 in connection with the processor 714.

Although not illustrated in this way in FIG. 7, the network communication program 738 may alternatively be stored and/or loaded in the communication interface 722. For example, the network communication program 738 may include and/or represent at least a portion of software and/or firmware that is executed by a processor and/or Application Specific Integrated Circuit (ASIC) incorporated in the communication interface 722.

As illustrated in FIG. 7, the example computing system 710 may also include a primary storage device 732 and a backup storage device 733 coupled to the communication infrastructure 712 via a storage interface 734. The storage devices 732 and 733 generally represent any type or form of storage device or medium capable of storing data and/or other computer-readable instructions. For example, the storage devices 732 and 733 may be a magnetic disk drive (e.g., a so-called hard drive), a solid state drive, a floppy disk drive, a magnetic tape drive, an optical disk drive, a flash drive, or the like. The storage interface 734 generally represents any type or form of interface or device for transferring data between the storage devices 732 and 733 and other components of the computing system 710. In one example, the data storage 120 from FIG. 1 may be stored and/or loaded in the primary storage device 732.

In certain embodiments, the storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 732 and 733 may also include other similar structures or devices for allowing computer software, data, or other computer-readable instructions to be loaded into the computing system 710. For example, the storage devices 732 and 733 may be configured to read and write software, data, or other computer-readable information. The storage devices 732 and 733 may also be a part of the computing system 710 or may be a separate device accessed through other interface systems.

Many other devices or subsystems may be connected to the computing system 710. Conversely, all of the components and devices illustrated in FIG. 7 need not be present to practice the embodiments described and/or illustrated herein. The devices and subsystems referenced above may also be interconnected in different ways from that shown in FIG. 7. The computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 710. All or a portion of the computer program stored on the computer-readable medium may then be stored in the system memory 716 and/or various portions of the storage devices 732 and 733. When executed by the processor 714, a computer program loaded into the computing system 710 may cause the processor 714 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 710 may be configured as an Application Specific Integrated Circuit (ASIC) adapted to implement one or more of the example embodiments disclosed herein.

Figure 8:
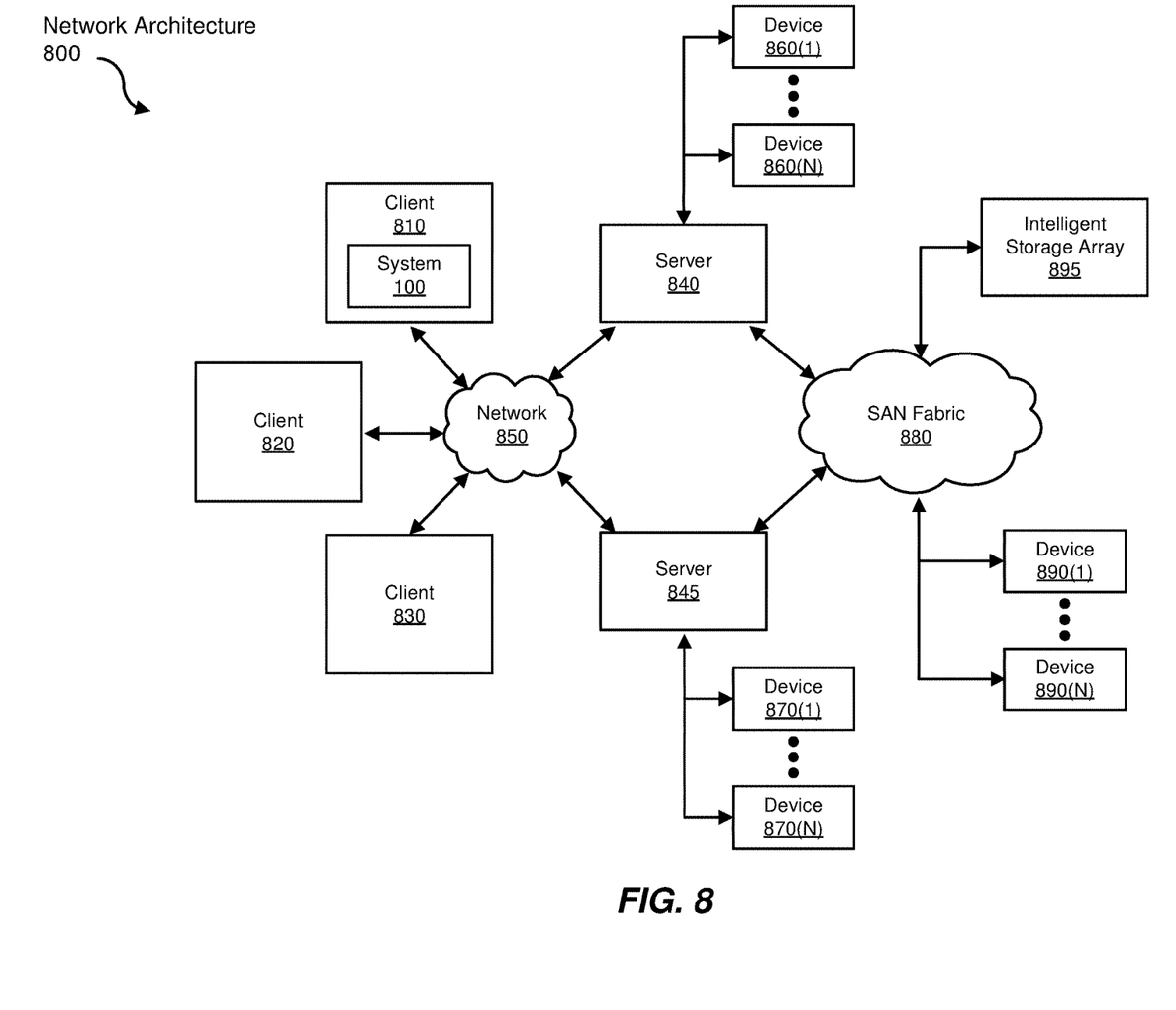
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of the network architecture 800 may perform and/or be a means for performing, either alone or in combination with other elements, one or more of the steps disclosed herein (such as one or more of the steps illustrated in FIG. 3). All or a portion of the network architecture 800 may also be used to perform and/or be a means for performing other steps and features set forth in the present disclosure.

The client systems 810, 820, and 830 generally represent any type or form of computing device or system, such as the example computing system 710 in FIG. 7. Similarly, the servers 840 and 845 generally represent computing devices or systems, such as application servers or database servers, configured to provide various database services and/or run certain software applications. The network 850 generally represents any telecommunication or computer network including, for example, an intranet, a WAN, a LAN, a PAN, or the Internet. In one example, the client systems 810, 820, and/or 830 and/or servers 840 and/or 845 may include all or a portion of the system 100 from FIG. 1.

As illustrated in FIG. 8, one or more storage devices 860(1)-(N) may be directly attached to the server 840. Similarly, the one or more storage devices 870(1)-(N) may be directly attached to the server 845. The storage devices 860(1)-(N) and the storage devices 870(1)-(N) generally represent any type or form of storage device or medium capable of storing data and/or other computer-readable instructions. In certain embodiments, the storage devices 860(1)-(N) and the storage devices 870(1)-(N) may represent Network-Attached Storage (NAS) devices configured to communicate with the servers 840 and 845 using various protocols, such as Network File System (NFS), Server Message Block (SMB), or Common Internet File System (CIFS).

The servers 840 and 845 may also be connected to a Storage Area Network (SAN) fabric 880. The SAN fabric 880 generally represents any type or form of computer network or architecture capable of facilitating communication between a plurality of storage devices. The SAN fabric 880 may facilitate communication between the servers 840 and 845 and a plurality of the storage devices 890(1)-(N) and/or an intelligent storage array 895. The SAN fabric 880 may also facilitate, via the network 850 and the servers 840 and 845, communication between the client systems 810, 820, and 830 and the storage devices 890(1)-(N) and/or the intelligent storage array 895 in such a manner that the devices 890(1)-(N) and the array 895 appear as locally attached devices to the client systems 810, 820, and 830. As with the storage devices 860(1)-(N) and the storage devices 870(1)-(N), the storage devices 890(1)-(N) and the intelligent storage array 895 generally represent any type or form of storage device or medium capable of storing data and/or other computer-readable instructions.

In certain embodiments, and with reference to the example computing system 710 of FIG. 7, a communication interface, such as the communication interface 722 in FIG. 7, may be used to provide connectivity between each client system 810, 820, and 830 and the network 850. The client systems 810, 820, and 830 may be able to access information on the server 840 or 845 using, for example, a web browser or other client software. Such software may allow the client systems 810, 820, and 830 to access data hosted by the server 840, the server 845, the storage devices 860(1)-(N), the storage devices 870(1)-(N), the storage devices 890(1)-(N), or the intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by the server 840, the server 845, the storage devices 860(1)-(N), the storage devices 870(1)-(N), the storage devices 890(1)-(N), the intelligent storage array 895, or any combination thereof. All or a portion of one or more of the example embodiments disclosed herein may also be encoded as a computer program, stored in the server 840, run by the server 845, and distributed to the client systems 810, 820, and 830 over the network 850.

As detailed above, the computing system 710 and/or one or more components of the network architecture 800 may perform and/or be a means for performing, either alone or in combination with other elements, one or more steps of an example method for malware detection using localized machine learning.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. The mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, the mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for malware detection using localized machine learning, at least a portion of the method being performed by a computing device comprising at least one processor, the method comprising:
    generating, by a computing device of a computing environment, a global score for a file using a global machine learning model;
    generating a localized score for the file using a localized machine learning model;
    identifying a number of new static clusters of computing devices in the computing environment of the computing device in a time period;
    determining that the number of the new static clusters is below an identified threshold;
    determining to use the localized machine learning model;
    determining that the file is malware using the global score, the localized score, and a local conviction threshold; and
    in response to determining that the file is malware, performing a security action to protect the computing device against malware.

2. The computer-implemented method of claim 1, wherein the global machine learning model is trained using a global dataset from a plurality of computing devices.

3. The computer-implemented method of claim 1, wherein the localized machine learning model is generated by re-training the global machine learning model using a local dataset of the computing device.

4. The computer-implemented method of claim 1, wherein the security action comprises:
    displaying, to a user of the computing device, an alert indicating that the file is malware; and
    removing the file from the computing device.

5. The computer-implemented method of claim 1, further comprising:
    calculating a false positive rate of the computing device; and
    determining the local conviction threshold using the false positive rate of the computing device.

6. The computer-implemented method of claim 5, further comprising:
    recalculating the false positive rate of the computing device; and
    adjusting the local conviction threshold using the recalculated false positive rate of the computing device.

7. The computer-implemented method of claim 5, further comprising:
    determining the false positive rate of the computing device by obtaining data from different malware detection systems and identification of a number of files incorrectly identified as malware.

8. A system for malware detection using localized machine learning, the system comprising:
    at least one physical processor;
    physical memory comprising computer-executable instructions that, when executed by the physical processor, cause the physical processor to:
        generate a global score for a file using a global machine learning model of a computing device;
        generate a localized score for the file using a localized machine learning model;
        identify a number of new static clusters of computing devices in a computing environment of the computing device in a time period;
        determine that the number of the new static clusters is below an identified threshold;
        determine to use the localized machine learning model;

determine that the file is malware using the global score, the localized score, and a local conviction threshold; and in response to determining that the file is malware, perform a security action to protect the computing device against malware.

9. The system of claim 8, wherein the global machine learning model is trained using a global dataset from a plurality of computing devices.

10. The system of claim 8, wherein the localized machine learning model is generated by re-training the global machine learning model using a local dataset of the computing device.

11. The system of claim 8, wherein the security action comprises:

displaying, to a user of the computing device, an alert indicating that the file is malware; and removing the file from the computing device.

12. The system of claim 8, wherein the computer-executable instructions further cause the physical processor to:

calculate a false positive rate of the computing device; and determine the local conviction threshold using the false positive rate of the computing device.

13. The system of claim 12, wherein the computer-executable instructions further cause the physical processor to:

recalculate the false positive rate of the computing device; and adjust the local conviction threshold using the recalculated false positive rate of the computing device.

14. The system of claim 12, wherein the computer-executable instructions further cause the physical processor to:

determine the false positive rate of the computing device by obtaining data from different malware detection systems and identification of a number of files incorrectly identified as malware.

15. A non-transitory computer-readable medium comprising one or more computer-executable instructions that, when executed by at least one processor of a computing device, cause the computing device to:

generate a global score for a file using a global machine learning model;

generate a localized score for the file using a localized machine learning model;

identify a number of new static clusters of computing devices in a computing environment of the computing device in a time period;

determine that the number of the new static clusters is below an identified threshold;

determine to use the localized machine learning model;

determine that the file is malware using the global score, the localized score, and a local conviction threshold; and in response to determining that the file is malware, perform a security action to protect the computing device against malware.

16. The non-transitory computer-readable medium of claim 15, wherein the global machine learning model is trained using a global dataset from a plurality of computing devices.

17. The non-transitory computer-readable medium of claim 15, wherein the localized machine learning model is generated by re-training the global machine learning model using a local dataset of the computing device.

18. The non-transitory computer-readable medium of claim 15, wherein the security action comprises:

displaying, to a user of the computing device, an alert indicating that the file is malware; and removing the file from the computing device.

19. The non-transitory computer-readable medium of claim 15, wherein the one or more computer-executable instructions further cause the computing device to:

calculate a false positive rate of the computing device; and determine the local conviction threshold using the false positive rate of the computing device.

20. The non-transitory computer-readable medium of claim 19, wherein the one or more computer-executable instructions further cause the computing device to:

recalculate the false positive rate of the computing device; and adjust the local conviction threshold using the recalculated false positive rate of the computing device.

* * * * *